United States Patent
Goodman et al.

(10) Patent No.: US 7,720,579 B2
(45) Date of Patent: May 18, 2010

(54) METHOD, SYSTEM, AND COMPUTER PROGRAM PRODUCT FOR PERFORMANCE MONITORED AIRCRAFT REJECTED TAKEOFF BRAKING

(75) Inventors: William L. Goodman, Coupeville, WA (US); Andrew J. Peck, Renton, WA (US); Thomas Imrich, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 707 days.

(21) Appl. No.: 11/642,126

(22) Filed: Dec. 20, 2006

(65) Prior Publication Data
US 2008/0154445 A1 Jun. 26, 2008

(51) Int. Cl.
*B64C 25/42* (2006.01)
*B60T 8/17* (2006.01)

(52) U.S. Cl. .............................. 701/16; 701/10; 701/14; 701/120; 303/191

(58) Field of Classification Search ................ 701/16.4, 701/14, 15, 120, 70, 85, 207, 213; 303/126, 303/191, 20, 177; 244/110 R, 188, 111, 244/183; 340/951, 972
See application file for complete search history.

(56) References Cited

U.S. PATENT DOCUMENTS

| | | | |
|---|---|---|---|
| 3,920,204 A * | 11/1975 | Bissell et al. ................ 244/111 |
| 4,454,582 A * | 6/1984 | Cleary et al. ................... 701/15 |
| 5,539,642 A | 7/1996 | Wiel | |
| 5,968,106 A | 10/1999 | DeVlieg et al. | |
| 6,107,943 A | 8/2000 | Schroeder | |
| 6,991,304 B2 | 1/2006 | Villaume | |
| 7,586,422 B2 * | 9/2009 | Goodman et al. ............ 340/945 |
| 2004/0054448 A1 * | 3/2004 | Ito ............................... 701/14 |
| 2007/0203633 A1 * | 8/2007 | Johnsen ........................ 701/70 |
| 2007/0260364 A1 * | 11/2007 | Dwyer ........................... 701/3 |

\* cited by examiner

Primary Examiner—Tan Q. Nguyen
(74) Attorney, Agent, or Firm—Toler Law Group

(57) ABSTRACT

In exemplary embodiments, braking of an airplane is controlled during a rejected takeoff. A rejected takeoff of an airplane from a runway is initiated. Position of the airplane is determined, such as by inputting aircraft position from a global positioning system. Distance remaining on the runway is determined. Deceleration to stop the aircraft in the determined distance remaining on the runway is calculated, and the calculated deceleration is provided to an autobraking system of the airplane. When the aircraft can not be stopped in the determined distance remaining on the runway, a predetermined deceleration that correlates to maximum braking may be provided to the aircraft's autobraking system. The calculated deceleration may be provided to the autobraking system until a pilot takes command of the aircraft's brakes or the aircraft has stopped.

37 Claims, 6 Drawing Sheets

METHOD, SYSTEM, AND COMPUTER PROGRAM PRODUCT FOR PERFORMANCE MONITORED AIRCRAFT REJECTED TAKEOFF BRAKING

BACKGROUND

A takeoff of an aircraft from a runway may be rejected for a variety of reasons, such as engine failure, activation of a takeoff warning horn, direction from air traffic control, blown tires, system warnings, and the like. For takeoff, currently-known autobraking systems are placed in a rejected takeoff ("RTO") mode. With a currently-known autobraking system in the RTO mode, a pilot typically can initiate a rejected takeoff maneuver by returning throttles to the "idle" position or by engaging reverse thrust.

Currently-known autobraking systems for large aircraft provide maximum braking pressure when a rejected takeoff is initiated. Characteristic of all rejected takeoffs is the objective of stopping the airplane within the remaining runway. Maximum braking is applied, typically at speeds above 85 knots, independent of the amount of runway remaining or the amount of headwind or temperature. During maximum braking, aircraft brakes absorb the braking energy and can become very hot. Absorption of the braking energy can cause brake over-temperature, brake fires, fuse plug melting, tire destruction, and subsequent runway closures. These results of brake energy absorption can lead to increased costs, decreased safety, and other issues for airlines and controlling agencies.

The rejected takeoff function of currently-known autobraking systems applies maximum braking without controlling deceleration and without consideration to application of less than maximum braking pressure. Thus, some of the consequences of absorption of brake energy can be incurred unnecessarily in instances when a rejected takeoff is initiated but the aircraft can be stopped on the remaining runway with application of less than maximum brake pressure.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

In exemplary embodiments, braking of an airplane is controlled during a rejected takeoff. A rejected takeoff of an airplane from a runway is initiated. Position of the airplane is determined, and distance remaining on the runway is determined. Deceleration to stop the aircraft in the determined distance remaining on the runway is calculated, and the calculated deceleration is provided to an autobraking system of the airplane.

According to an aspect, a determination may be made whether the aircraft can be stopped in the determined distance remaining on the runway. When the aircraft can not be stopped in the determined distance remaining on the runway, a maximum braking signal is provided to the aircraft's autobraking system.

According to another aspect, position of the aircraft may be determined by inputting aircraft position from a navigation system that can incorporate inputs from internal and external sensors, such as an inertial navigation system, space and terrestrial-based electronic navigation aids, and crew-entered or activated position information.

According to another aspect, the calculated deceleration may be provided to the autobraking system until a pilot takes command of the aircraft's brakes or the aircraft has stopped.

According to another aspect, braking performance may be displayed.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Given by way of non-limiting overview, in exemplary embodiments braking of an airplane is controlled during a rejected takeoff. A rejected takeoff of an airplane from a runway is initiated. Position of the airplane is determined, such as by inputting aircraft position from a global positioning system. Distance remaining on the runway is determined. Deceleration to stop the aircraft in the determined distance remaining on the runway is calculated, and the calculated deceleration is provided to an autobraking system of the airplane. When the aircraft can not be stopped in the determined distance remaining on the runway, a predetermined deceleration that correlates to maximum braking may be provided to the aircraft's autobraking system. The calculated deceleration may be provided to the autobraking system until a pilot takes command of the aircraft's brakes or the aircraft has stopped. Braking performance may be displayed. Details of exemplary embodiments will be set forth below.

Figure 1:
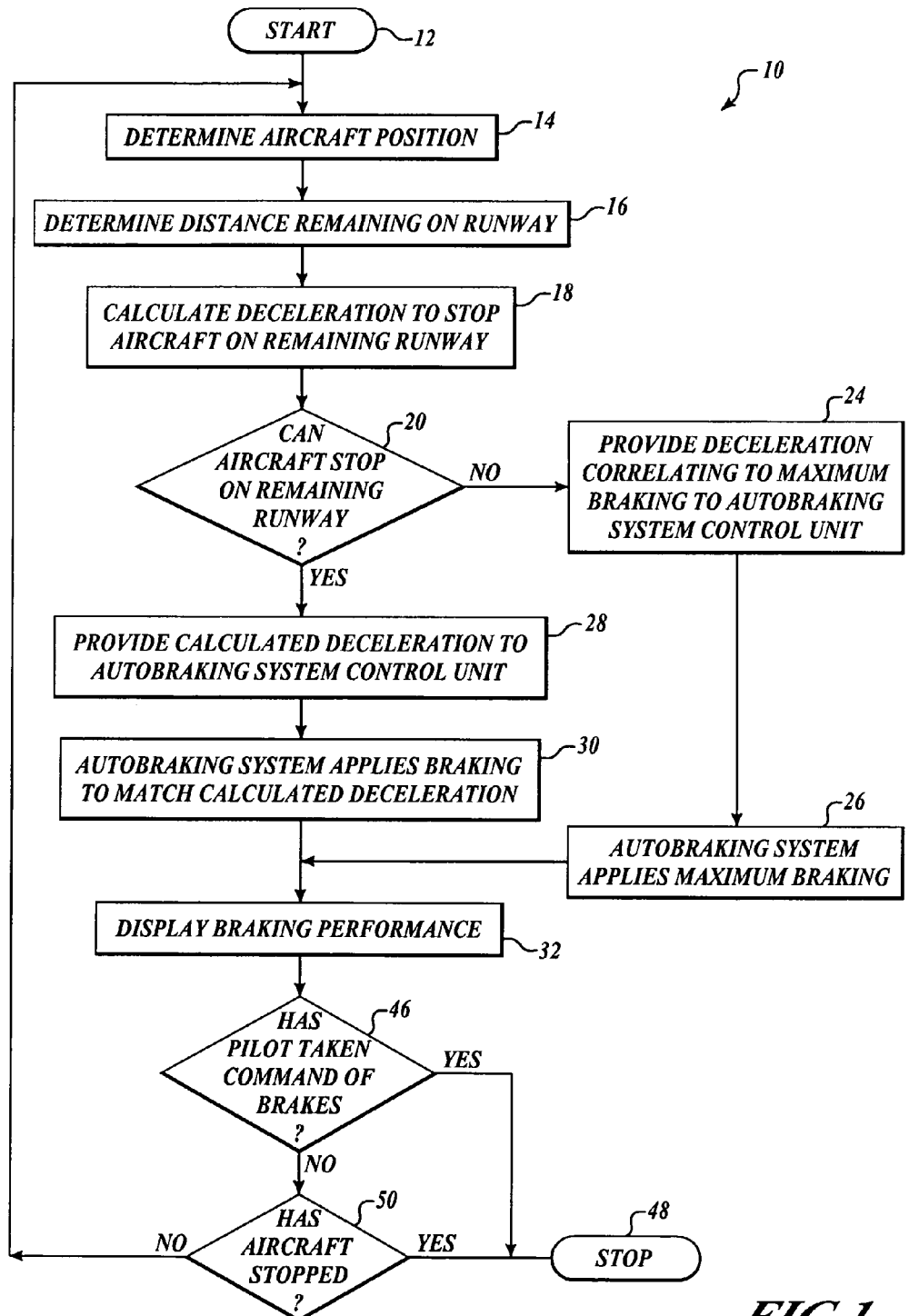
FIG. 1 is a flow chart of an exemplary method of controlling braking of an aircraft during rejected takeoff from a runway.

Referring now to FIG. 1, an exemplary method 10 controls braking of an aircraft during a rejected takeoff from a runway. At a block 12, a rejected takeoff of an aircraft from a runway is initiated. For example, with an autobraking system in a rejected takeoff ("RTO") mode, a pilot can initiate a rejected takeoff maneuver by returning throttles (or autothrottles) to the "idle" position or by engaging reverse thrust. A rejected takeoff is imitated at speeds less than "decision speed", also referred to as $V_1$, that is the minimum speed in the takeoff, following a failure of the critical engine, at which the takeoff can be continued with only the remaining engines. Below $V_1$ the takeoff is to be rejected; above $V_1$ the takeoff is to be continued and the aircraft is to be returned for landing.

At a block 14, position of the aircraft on the runway is determined. In exemplary embodiments, aircraft position is determined by an integrated navigation system whose inputs may include global positioning system (GPS) or other space-based navigation systems, with or without accuracy augmentation. In some such cases, position of the aircraft on the runway can be determined within around 1 meter. Moreover, in such cases position can be updated around once every second or so. However, if desired, in other embodiments aircraft position may be determined by other position determining systems and methods, such as counting tire rotations from a known fix, terrestrial Distance Measuring Equipment (DME), and internal accelerometers. A signal that is indicative of aircraft position is provided to a suitable computer processor, such as without limitation a flight management computer or the like.

At a block 16 distance remaining on the runway is calculated. The distance remaining on the runway is calculated as the difference between the position of the aircraft and the end of the runway. The runway end position is retrieved from an on-board electronic Navigation Database (NDB). The runway end position retrieved from the NDB is compared with the aircraft position, as determined at the block 14, to determine distance remaining on the runway.

At a block 18 deceleration for the aircraft to be stopped in the distance remaining on the runway is calculated. Deceleration is calculated from a basic equation of motion:

$$v_{final} = v + at \quad (1)$$

where:
$v_{final}$=final aircraft velocity
v=current aircraft velocity
a=average aircraft acceleration
t=time
Position is determined by integrating equation (1):

$$x_{final} = x + vt + (½)at^2 \quad (2)$$

where $x_{final}$=final aircraft position
x=current aircraft position

As discussed above, the distance remaining on the runway, L, is the difference between the final position of the aircraft (that is, the end of the runway) and the present position of the aircraft. The distance remaining on the runway, L, is derived from equation (2):

$$L = |x_{final} - x| = |vt + (½)at^2| \quad (3)$$

Equation (1) can be rearranged to solve for time:

$$t = (v_{final} - v)/a \quad (4)$$

With equations (3) and (4) there are two equations and two unknowns (that is, a and t). Substituting equation (4) into equation (3) yields $$L = |v\{(v_{final} - v)/a\} + (½)a\{(v_{final} - v)/a\}^2| \quad (5)$$

Simplifying, $$L = |(½a)(v_{final}^2 - v^2)| \quad (6)$$

Solving for acceleration, a, in equation (6) yields $$a = \pm|(½L)(v_{final}^2 - v^2)| \quad (7)$$

However, the final velocity of the aircraft at the end of the rejected takeoff is zero. With $v_{final}=0$, equation (7) simplifies to $$a = \pm|-v^2/2L| \quad (8)$$

A deceleration signal is the magnitude of the acceleration calculated in equation (8):

$$decel = |-v^2/2L| \quad (9)$$

If desired, the performance calculations described above may be refined to include more parameters that are indicative of specific characteristics of airframes and environmental conditions that can affect aerodynamic drag. For example, airframe characteristics can include configuration of high-lift devices, such as flaps, flaperons, or the like. Environmental conditions may include, but not be limited to, runway slope, surface type, friction measurements by aircraft or ground sensors, braking effectiveness reports, and atmospheric conditions.

The distance remaining on the runway, L, is assigned a minimum value that is greater than zero in order to prevent computation errors (by dividing by zero) when the aircraft is at the end of the runway (that is, when the value of L would be zero). For example, a minimum value of L may be assigned as the position uncertainty (or accuracy) of the position determining system. Given by way of non-limiting example, when position of the aircraft is determined by a global positioning system, the minimum value of L may be around 3 meters or so. However, any minimum value for L (that is greater than zero) may be selected as desired for a particular application.

At a decision block 20, a determination is made whether the aircraft can stop on the remaining runway. Such a determination can be made based upon analysis of distance remaining on the runway. As discussed above, at the block 16 distance remaining on the runway is calculated based on position of the aircraft that was determined at the block 14. This distance calculated at the block 16 can be considered the actual distance remaining on the runway, $L_{actual}$. As also discussed above, distance remaining on the runway, L, can be calculated according to equation (6). Because $v_{final}$ is zero, equation (6) can be simplified to $$L_{calc} = |(½a)(-v^2)| \quad (10)$$

By using the calculated deceleration decel from equation (9) and current aircraft velocity v sensed by a global positioning system or an air data inertial reference unit or the like, the distance remaining on the runway, $L_{calc}$, calculated according to equation (10) can be considered a calculated distance remaining on the runway. When the calculated distance remaining on the runway, $L_{calc}$, exceeds the actual distance remaining on the runway, $L_{actual}$, then the aircraft can not be stopped in the distance remaining on the runway. Alternately, when the calculated distance remaining on the runway, $L_{calc}$, is less than or equal to the actual distance remaining on the runway, $L_{actual}$, then the aircraft can be stopped in the distance remaining on the runway.

When it is determined at the decision block 20 that the aircraft can not be stopped in the distance remaining on the runway, then at a block 24 a predetermined deceleration that correlates to maximum braking is provided to a control unit of the aircraft's autobraking system. For example and without limitation, in many currently known commercial aircraft a deceleration of at least 12 ft/sec² correlates to maximum braking and is provided to the aircraft's autobraking control unit. A safety margin can be provided by selecting an even higher deceleration. For example, for an aircraft autobraking system in which a deceleration of 12 ft/sec² correlates to maximum braking, providing a deceleration of 14 ft/sec² to the aircraft's autobraking control unit establishes a safety margin that helps to ensure that the autobraking system applies maximum braking. Correlation of deceleration to maximum braking can vary from aircraft to aircraft. Therefore, the above example is given by way of illustration only and is not intended to be limiting in any respect whatsoever.

At a block 26, the aircraft's autobraking system applies maximum braking. In one non-limiting example, braking may be applied by electric brakes. In such an embodiment, maximum braking is effected by electric brakes via electromechanical actuators, such as an electric motor and gears, causing actuators on a brake ring to press carbon disks against each other in a manner to cause maximum braking. In another non-limiting example, braking may be applied by hydraulic brakes. Maximum braking pressure in a hydraulic brake system may vary from aircraft to aircraft. For example, in many commercial aircraft, maximum braking pressure is around 3,000 psig. However, the maximum braking pressure can vary from autobraking system to autobraking system.

Conversely, when it is determined at the decision block 20 that the aircraft can be stopped in the distance remaining on the runway, then at a block 28 the calculated deceleration decel is provided to the autobraking control unit. At a block 30, responsive to the calculated deceleration decel the autobraking system applies braking that correlates to the calculated deceleration. In one non-limiting example, braking may be applied by electric brakes. In such an embodiment, electromechanical actuators cause actuators on a brake ring to press carbon disks against each other in a manner to cause braking that results in the calculated deceleration.

Figure 2:
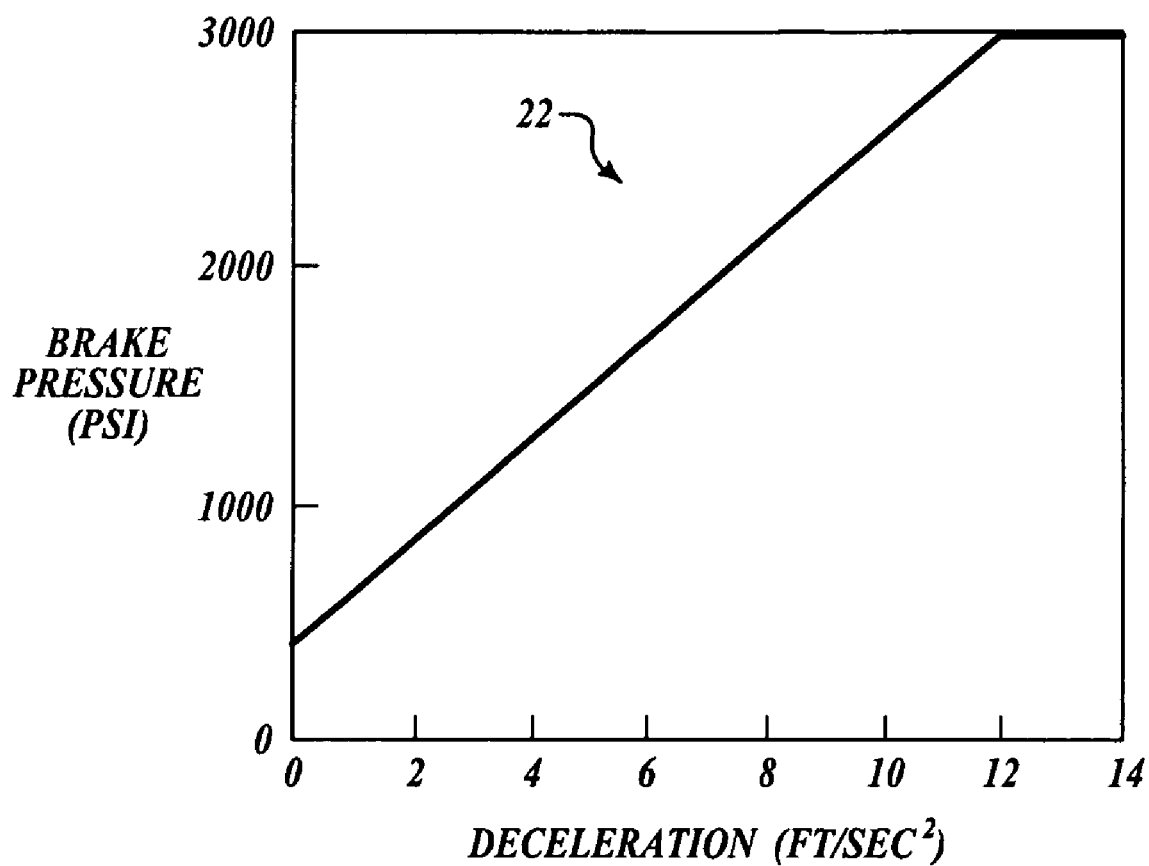
FIG. 2 is a graph of brake pressure versus deceleration.

Given by way of another non-limiting example, braking may be applied by hydraulic brakes. Referring additionally to FIG. 2 and as can be seen from a graph 22 of brake pressure versus deceleration for a typical aircraft autobraking system, braking pressure of around 3000 psig is applied responsive to a calculated deceleration of around 12 ft/sec$^2$, braking pressure of around 2000 psig is applied responsive to a calculated deceleration of around 7.2 ft/sec$^2$, braking pressure of around 1500 psig is applied responsive to a calculated deceleration of around 5 ft/sec$^2$, and braking pressure of around 1250 psig is applied responsive to a calculated deceleration of around 4 ft/sec$^2$. Such braking pressure-deceleration correlation is typically provided in known autobraking systems as selectable autobraking levels that can be used during landing. The non-limiting graph 22 is fit through these typical correlation values and, for deceleration less than or equal to 12 ft/sec$^2$, is given by the equation $$\text{brake pressure (in psig)} = 208.33 \times \text{deceleration (in ft/sec2)} + 500 \quad (11)$$

Brake pressure is set to a value of 3,000 psig (corresponding to maximum braking pressure) for deceleration greater than 12 ft/sec$^2$.

In the hydraulic brake embodiment, the brake pressure to be applied at the block 30 is calculated by an autobraking control unit by applying equation (11) to the calculated deceleration decel. Alternately, a number of discrete points that lie along the graph 22 can be entered and stored in a look-up table. The look-up table can be provided as part of the autobraking control unit, or as part of a flight management computer or a flight management system, or a standalone database, as desired for a particular application. An autobraking control unit can access the look-up table, enter the look-up table with calculated deceleration, and retrieve from the look-up table a braking pressure that corresponds to the calculated deceleration.

From the blocks 26 and 30, the method 10 proceeds to a block 32 at which braking performance is displayed. A measure of braking performance that may be displayed is whether or not the aircraft can be stopped on the runway, as determined by calculations described previously, and within parameters specified by the manufacturer and/or the operator. Another measure of braking performance that may be displayed is a braking performance green arc on the airport map display.

Braking performance can be displayed in any manner and on any display device as desired for a particular application. For example, braking performance can be displayed on a head-up display or a head-down display, such as a primary flight display or a secondary display like navigation display, as desired. Further, symbology used to represent braking performance can be any symbology as desired for a particular application. In an exemplary embodiment given by way of non-limiting example, standard symbology is displayed on an aircraft's primary flight display. The primary flight display is monitored by the flight crew in the flight deck during takeoff, so use of the primary flight display to display braking performance does not disrupt the flight crew's typical takeoff routine. Use of standard, known symbology does not introduce symbols that may be new to a flight crew.

Figure 3A:
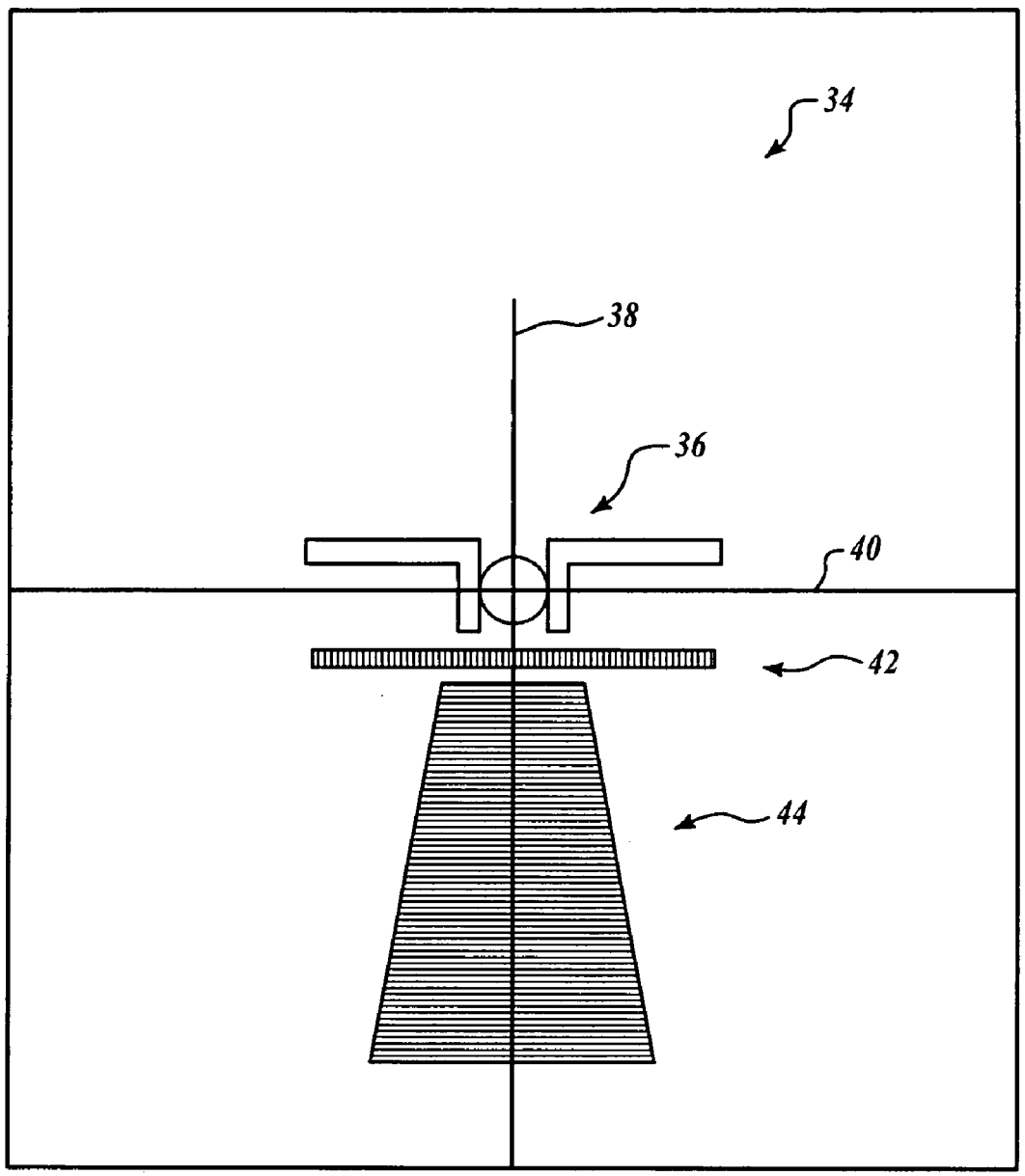
FIGS. 3A and 3B illustrate exemplary primary flight displays.
Figure 3B:
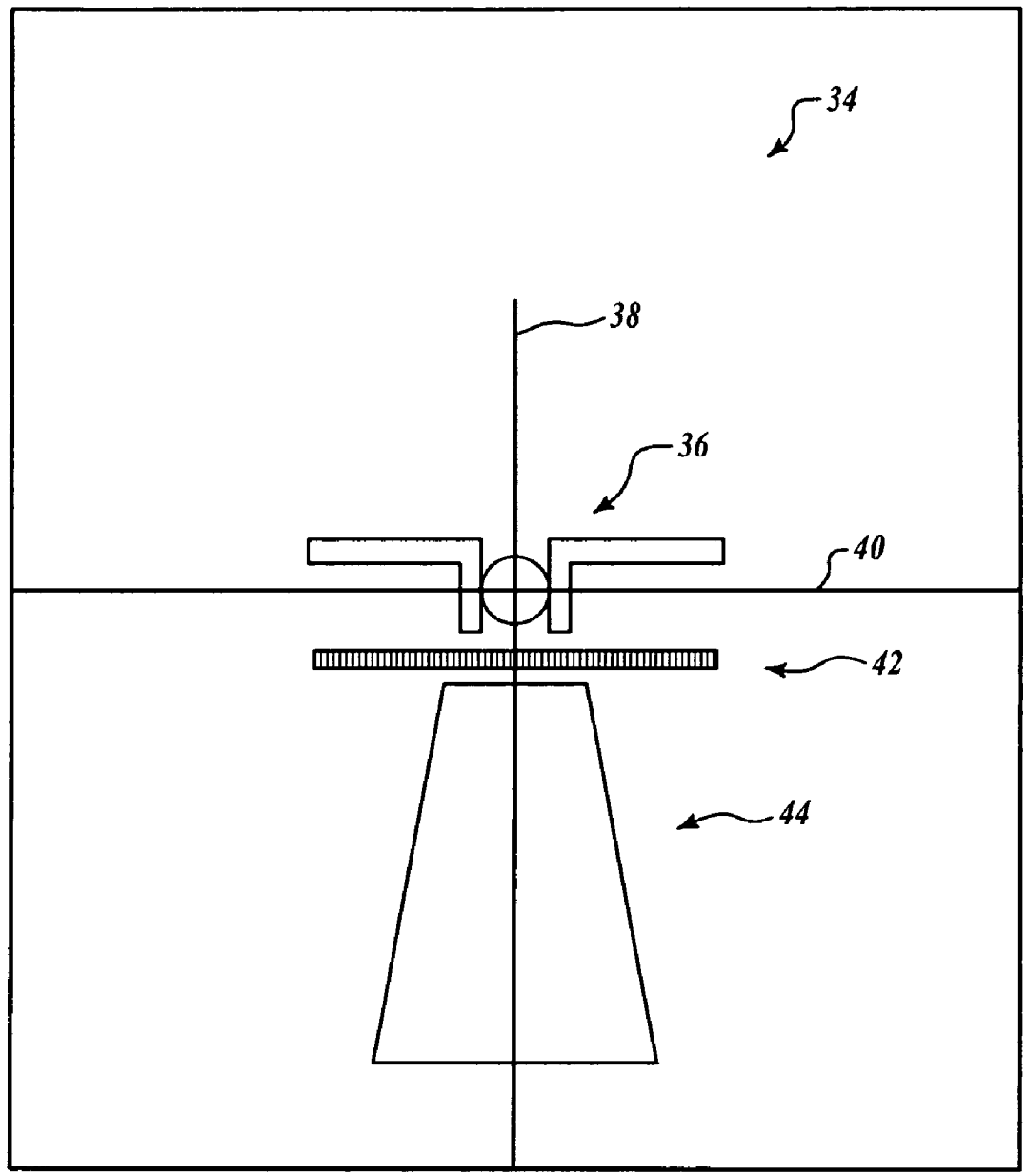

For example, referring briefly now to FIGS. 3A and 3B, a primary flight display 36 includes standard symbology such as an airplane symbol 36, a roll steering bar 38, a horizon line 40, a pitch bar 42, and a runway symbol 44. Referring now to FIG. 3A, when the aircraft can be stopped on the runway, the runway symbol 44 is displayed in a standard manner in which a member of a flight crew expects to see the runway symbol 44 appear during normal operations. For example, the runway symbol 44 may appear filled in with a solid standard color, such as green, that is indicative of normal operation and that is known to flight crews. Appearance of the runway symbol 44 in an expected manner concisely communicates to the flight crew that the airplane can stop on the runway.

Referring now to FIG. 3B, when the aircraft can not be stopped on the runway, the runway symbol 44 is displayed in a non-standard manner that is different from a standard manner in which a member of a flight crew expects to see the runway symbol 44 appear during normal operations. For example, the runway symbol 44 may appear "greyed out", or may appear filled in with a non-standard color, such as red, that is not indicative of normal operation, or may flash intermittently, or may be filled in with symbols (not shown) that may be anything other than a solid color expected for normal operation. The above examples of non-standard display of the runway symbol 44 are given by way of example and are not intended to be limiting. Any non-standard display of the runway symbol 44 can be used as desired to indicate that the aircraft can not be stopped in the distance remaining in the runway.

Referring back to FIG. 1, at a decision block a determination is made whether a pilot has taken command of the brakes (that is, a pilot has applied brake pedals). When a pilot has taken command of the brakes, the method 10 stops at a block 48.

When a pilot has not taken control of the brakes, a determination is made at a decision block 50 whether or not the aircraft has stopped. For example, an indication that an aircraft has stopped is when current velocity v (that is, ground speed from an air data inertial reference unit) equals zero. When the aircraft has stopped, the method 10 stops at the block 48. When the aircraft has not stopped, the method 10 returns to the block 14 and the method 10 iteratively continues, with aircraft position being updated around once per second at the block 14 when the aircraft's position is determined with a global positioning system.

Figure 4:
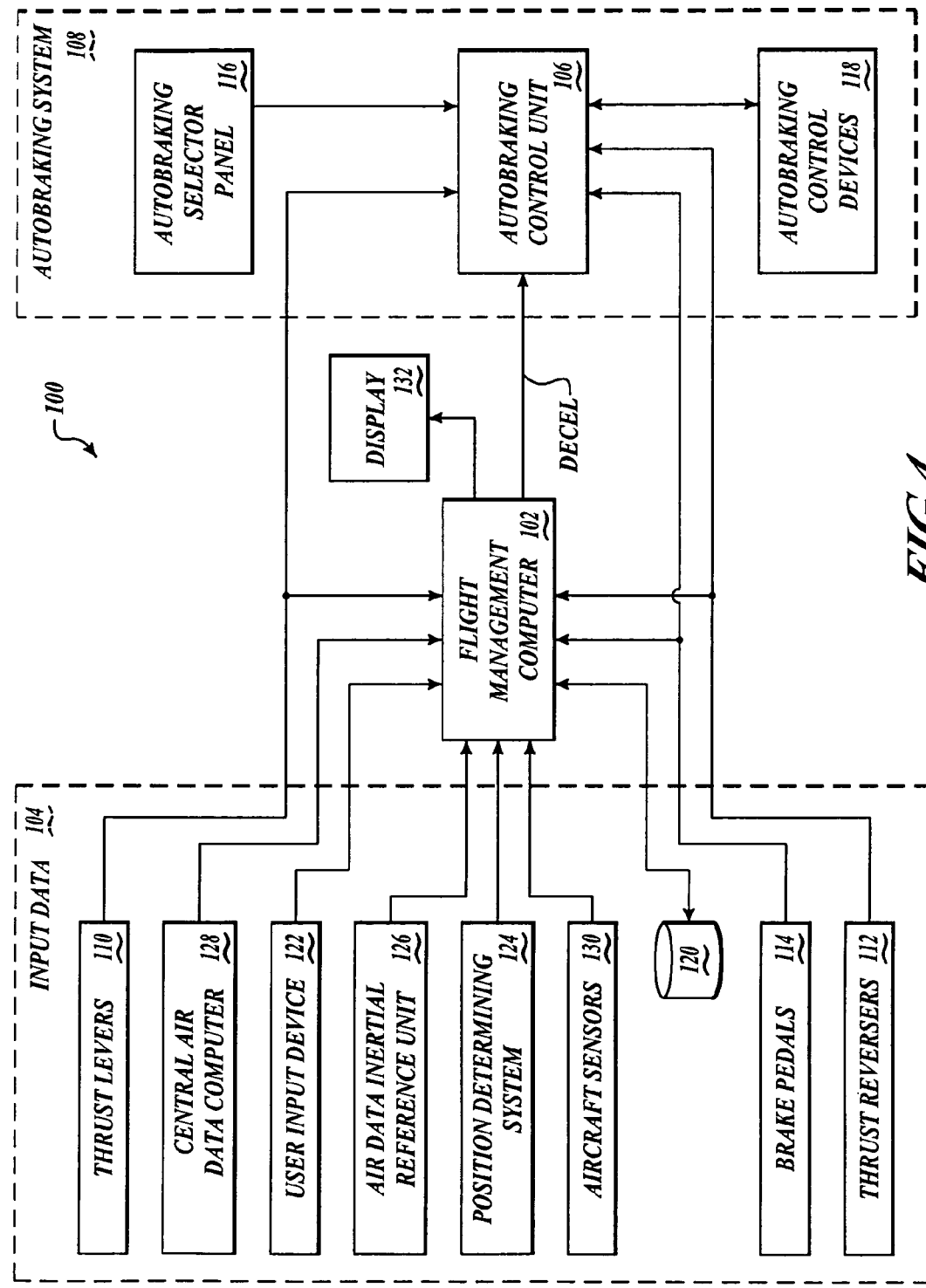
FIG. 4 is a block diagram of an exemplary system that executes the method shown in FIG. 1.

Referring now to FIG. 4, an exemplary system 100 controls braking of an aircraft during a rejected takeoff from a runway. To that end, the system 100 suitably executes the method 10 (FIG. 1). Given by way of non-limiting example, in an exemplary embodiment the system 100 includes a processor 102, such as without limitation a flight management computer or the like, and input data sources 104. The input data sources provide suitable input signals to input interfaces (not shown) of the processor 102 and to an autobraking control unit 106 of an autobraking system 108. The processor 102 provides the calculated deceleration decel to the autobraking control unit 106.

The input data sources provide various input data used by the processor 102 in executing the method 10 (FIG. 1). For example, a signal indicative of position of thrust levers (or autothrottles) 110 is provided to the processor 102. During takeoff, placement of the thrust levers 110 to idle is indicative of initiation of a rejected takeoff maneuver. In such a case, the processor 102 causes the method 10 to begin at the block 12 (FIG. 1).

A signal indicative of operation of thrust reversers 112 is provided to the processor 102. During takeoff, engagement of reverse thrust is indicative of initiation of a rejected takeoff maneuver. In such a case, the processor 102 causes the method 10 to begin at the block 12 (FIG. 1).

A signal indicative of operation of brake pedals 114 is provided to the processor 102. During a rejected takeoff maneuver, operation of the brake pedals 114 is indicative of a pilot taking command of the brakes. In such a case, the processor 102 makes a determination at the decision block 46 (FIG. 1) that the pilot has taken command of the brakes and causes the method 10 to stop at the block 48 (FIG. 1).

The signals provided by the thrust levers 110, the thrust reversers 112, and the brake pedals 114 are also provided to the autobraking control unit 106 for controlling braking during a rejected takeoff. When an autobraking selector panel 116 of the autobraking system 108 is configured to select a rejected takeoff (RTO) function, the autobraking system 108 is placed in an RTO mode. When the autobraking system 108 is in the RTO mode and the autobraking control unit 106 receives either (i) a signal indicating that the thrust levers 110 have been repositioned to idle or (ii) a signal indicating that the thrust reversers 112 have engaged reverse thrust, the autobraking control unit 106 determines braking that correlates to the calculated deceleration decel. The autobraking control unit 106 controls autobraking control devices 118 (such as electromechanical actuators in an electric brake system or control valves in a hydraulic brake system) to cause application of maximum braking at the block 26 (FIG. 1) or braking correlating to the calculated deceleration decel at the block 30 (FIG. 1).

When a rejected takeoff maneuver is being performed and a pilot takes command of the brakes, then the signal indicative of operation of the brake pedals 114 causes the autobraking control unit 106 to stop controlling the autobraking control devices 118.

Other input data sources 104 are provided to the processor 102 but need not be provided to the autobraking control unit 106. For example, databases 120 may reside within a flight management computer system or may be standalone databases. The databases 120 suitably provide information regarding runway position and runway length.

A user input device 122 may be used by the flight crew to enter various parameters or to modify parameters supplied by the databases 120. For example, the flight crew may modify runway length due to temporary changes to runway length due to, for example, construction or because a takeoff is started at an intersection. A flight crew may enter data indicative of runway condition (such as contaminants or braking condition, like coefficient of friction), runway slope (from approach charts), runway surface type (such as construction material like concrete, asphalt, dirt, or the like), whether a runway is grooved, or the like. The user input device may be any acceptable user input device as desired. In some aircraft, a control display unit (CDU) of a navigation display (ND) suitably may be used as the user input device 122.

A position determining system 124 can provide various data to the processor 102. For example, as discussed above the position determining system 124 may be a global positioning system (GPS). Use of a GPS permits determining position of an aircraft within a position uncertainty of around 3 meters or so, with determined position being updated around once per second. A GPS can also provide actual current velocity and actual current deceleration to the processor 102. Alternately, the position determining system 122 may be a global navigation satellite system (GNSS) other than a GPS, if desired. As a further example, the position determining system 122 may be an aircraft navigation system. Like a GPS, an aircraft navigation system can provide aircraft position information as well as actual current velocity and actual current deceleration to the processor 102.

An air data inertial reference unit 126 can provide acceleration information (in this case, actual deceleration) to the processor 102. A Central Air Data Computer 128 can provide ground speed (that is, current velocity) to the processor 102.

Aircraft sensors 130 can provide various sensed information to the processor 102. For example, accelerometers can provide current acceleration information. As a further example, current velocity can be provided by an aircraft's navigation system, which has several inputs. Primary information comes from an inertial navigation system's accelerometers (second integral of accelerations), with additional information from space-based (such as GPS) and terrestrial (such as Distance Measuring Equipment ("DME")) sensors. Landing gear rotation information can be provided to the processor 102 to determine position of the aircraft on the runway, if desired. Also, configuration of high-lift devices, such as flaps, flaperons, or the like, can be provided to the processor 102 as effects on aerodynamic drag in the calculation at the block 18 (FIG. 1).

A display 132 displays braking performance. As discussed above, the display 132 may be any display device as desired for a particular application. For example and as discussed above, the display 132 can be a head-up display or a head-down display, such as a primary flight display or a secondary display like navigation display, as desired. In an exemplary embodiment, the display 132 may be a primary flight display and the displayed symbology is shown in FIGS. 3A and 3B, as discussed above.

In various embodiments, portions of the system 100 (FIG. 4) and the method 10 (FIG. 1) include a computer program product. The computer program product may be bundled with the system 100 for inclusion in a new aircraft, or the computer program product may be incorporated into systems in an existing aircraft as a retrofit. Regardless of the manner of providing the computer program product, the computer program product includes a computer-readable storage medium, such as a non-volatile storage medium, and computer-readable program code portions, such as a series of computer instructions, embodied in the computer-readable storage medium. Typically, the computer program is stored and executed by a processing unit or a related memory device, such as the processor 102 and/or the autobraking control unit 106 depicted in FIG. 4.

In this regard, FIGS. 1 and 4 are flowcharts and block diagrams of methods, systems and program products according various embodiments. It will be understood that each block of the block diagrams and flowcharts and combinations of blocks in the block diagrams and flowcharts can be implemented by computer program instructions. These computer program instructions may be loaded onto a computer or other programmable apparatus to produce a machine, such that the instructions which execute on the computer or other programmable apparatus create means for implementing the functions specified in the block diagrams or flowchart blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the block diagrams or flowchart blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagrams or flowchart blocks.

Accordingly, blocks of the block diagrams or flowcharts support combinations of means for performing the specified functions, combinations of steps for performing the specified functions and program instruction means for performing the specified functions. It will also be understood that each block of the block diagrams or flowcharts, and combinations of blocks in the block diagrams or flowcharts, can be implemented by special purpose hardware-based computer systems which perform the specified functions or steps, or combinations of special purpose hardware and computer instructions.

Figure 5:
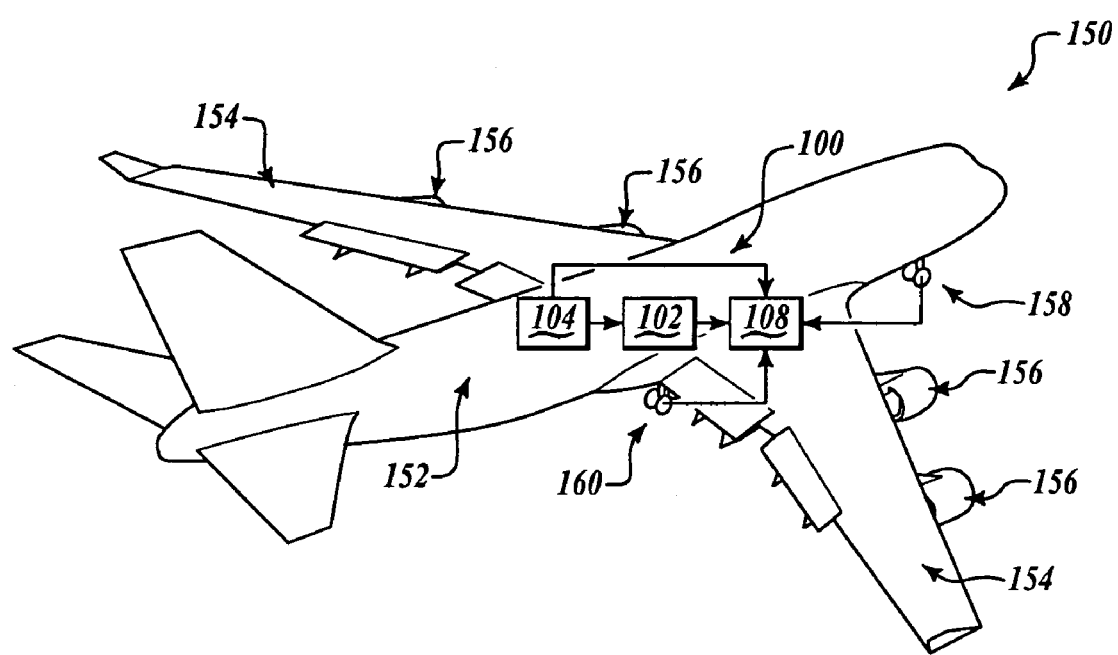
FIG. 5 is a perspective view, in partial schematic form, of an exemplary aircraft that incorporates the system of FIG. 4.

Referring now to FIGS. 1-5, an exemplary aircraft 150 suitably includes the system 100 (FIG. 4) and an autobraking system 108 (FIG. 4). The aircraft 150 includes a fuselage 152, a pair of wings 154, engines 156, and landing gear including a nose gear 158 and main landing gear 160. While the aircraft 150 is depicted for purposes of illustration as a large commercial aircraft, it will be appreciated that the aircraft 150 is not intended to be so limited. The aircraft 150 suitably is any aircraft, and may be any civil or military aircraft of any size and may be manned or unmanned, as desired. For purpose of clarity, only high level components such as the processor 102, the input data sources 104, and the autobraking system 108 are shown in FIG. 5. Construction and operation of the system 100 has been set forth above. Details of construction and operation of the system 100 need not be repeated for an understanding.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method of controlling braking of an aircraft during a rejected takeoff, the method comprising:
    initiating a rejected takeoff of an aircraft from a runway;
    determining a position of the aircraft;
    determining a distance remaining on the runway;
    calculating a deceleration to stop the aircraft in the distance remaining on the runway;
    when the aircraft can be stopped by an autobraking system of the aircraft in the distance remaining on the runway, providing a signal directing the deceleration to be applied by the autobraking system; and
    when the aircraft cannot be stopped by the autobraking system in the distance remaining on the runway, causing the autobraking system to apply a maximum braking.

2. The method of claim 1, further comprising applying braking to achieve the deceleration when the aircraft can be stopped by the autobraking system in the distance remaining on the runway.

3. The method of claim 1, further comprising applying the maximum braking when the aircraft cannot be stopped by the autobraking system in the distance remaining on the runway.

4. The method of claim 1, further comprising:
    determining a distance in which the aircraft can be stopped by the autobraking system using up to the maximum braking; and
    determining whether the aircraft can be stopped in the distance remaining on the runway by comparing the distance in which the aircraft can be stopped with the distance remaining on the runway.

5. The method of claim 4, wherein determining the distance in which the aircraft can be stopped by the autobraking system using up to the maximum braking is based on at least one of:
    airframe characteristics of the aircraft; and
    environmental factors.

6. The method of claim 1, wherein determining the position of the aircraft includes inputting the position of the aircraft from a global positioning system.

7. The method of claim 1, wherein the deceleration is provided to the autobraking system until occurrence of an event selected from a pilot taking command of brakes and the aircraft stopping.

8. The method of claim 1, further comprising displaying braking performance.

9. The method of claim 1, wherein the signal directing the deceleration to be applied indicates a brake pressure to be applied by the autobraking system.

10. A system for controlling braking of an aircraft during a rejected takeoff; the system comprising:
    a first input interface configured to receive a rejected takeoff signal indicative of initiation of a rejected takeoff of an aircraft from a runway;
    a second input interface configured to receive a position signal indicative of a position of the aircraft on the runway;
    a processor including:
        a first component configured to determine a distance remaining on the runway;
        a second component configured to calculate a deceleration to stop the aircraft in the distance remaining on the runway;
        a third component configured to determine whether the aircraft can be stopped by an autobraking control unit of the aircraft in the distance remaining on the runway; and
    an output interface configured to provide the deceleration to the autobraking control unit, and to provide a signal to the autobraking control unit, wherein:
        when the aircraft can be stopped by the autobraking control unit in the distance remaining on the runway, the signal causes the autobraking control unit to apply the deceleration to stop the aircraft in the distance remaining on the runway; and
        when the aircraft cannot be stopped by the autobraking control unit in the distance remaining on the runway, the signal causes the autobraking control unit to apply a maximum braking.

11. The system of claim 10, wherein:
the third component is further configured to calculate a distance in which the aircraft can be stopped by the autobraking control unit using up to the maximum braking; and
the third component is further configured to compare the distance in which the aircraft can be stopped with the distance remaining on the runway to determine whether the aircraft can be stopped in the distance remaining on the runway.

12. The system of claim 11, wherein determining the distance in which the aircraft can be stopped by the autobraking control unit using up to the maximum braking is based on at least one of:
airframe characteristics of the aircraft; and
environmental factors.

13. The system of claim 10, wherein the second input interface is further configured to receive the position signal from a global positioning system.

14. The system of claim 10, wherein the first and second components of the processor are further configured to determine the distance remaining on the runway and to calculate the deceleration, respectively, until occurrence of an event selected from a pilot taking command of brakes and the aircraft stopping.

15. The system of claim 10, further comprising a display configured to display braking performance.

16. The system of claim 10, wherein the signal provided to the autobraking control unit indicates a brake pressure to be applied by the autobraking control unit.

17. A computer-readable storage medium storing instructions executable by a computer system to control braking of an aircraft during a rejected takeoff, the computer-readable storage medium storing instructions to:
determine a position of the aircraft;
determine a distance remaining on a runway;
determine whether the aircraft can be stopped by an autobraking system of the aircraft in the distance remaining on the runway using up to a maximum braking;
when the aircraft can be stopped by the autobraking system in the distance remaining on the runway, calculate a deceleration to be applied by the autobraking system to stop the aircraft in the distance remaining on the runway during a rejected takeoff from the runway; and
when the aircraft cannot be stopped by the autobraking system in the distance remaining on the runway, direct the autobraking system to apply the maximum braking.

18. The computer-readable storage medium of claim 17, further comprising instructions to:
calculate a distance in which the aircraft can be stopped by the autobraking system using up to the maximum braking; and
determine whether the distance in which the aircraft can be stopped by the autobraking system is not more than the distance remaining on the runway.

19. The computer-readable medium of claim 18, wherein calculating the distance in which the aircraft can be stopped by the autobraking system using up to the maximum braking is based on at least one of:
airframe characteristics of the aircraft; and
environmental factors.

20. The computer-readable medium of claim 19, wherein the airframe characteristics include one or more of a configuration of flaps, flaperons, and other highlight devices.

21. The computer-readable medium of claim 19, wherein the environmental factors include one or more of runway slope, surface type, friction measurements provided by one of aircraft sensors and ground sensors, braking effectiveness reports, and atmospheric conditions.

22. The computer-readable storage medium of claim 17, wherein data generated by a global positioning system is used to determine the position of the aircraft.

23. The computer-readable storage medium of claim 17, further comprising instructions to determine the distance remaining on the runway and to calculate the deceleration, respectively, until occurrence of an event selected from a pilot taking command of brakes and the aircraft stopping.

24. The computer-readable storage medium of claim 17, further comprising instructions to cause brake performance to be displayed.

25. A system configured to brake an aircraft during a rejected takeoff, the system comprising:
a first input interface configured to receive a rejected takeoff signal indicative of initiation of a rejected takeoff of an aircraft from a runway;
a second input interface configured to receive a position signal indicative of a position of an aircraft on the runway;
a processor including:
a first component configured to determine a distance remaining on the runway;
a second component configured to calculate deceleration to stop the aircraft in the distance remaining on the runway; and
a third component configured to determine whether the aircraft can be stopped in the distance remaining on the runway by using up to a maximum braking; and
an aircraft autobraking system configured to cause braking to be applied to aircraft brakes up to the maximum braking, wherein:
when the aircraft can be stopped in the distance remaining on the runway, to apply the aircraft autobraking system according to the deceleration; and
when the aircraft cannot be stopped in the distance remaining on the runway, to apply the maximum braking.

26. The system of claim 25, wherein
the third component is further configured to calculate a distance in which the aircraft can be stopped by the aircraft autobraking system using up to the maximum braking and to compare the distance in which the aircraft can be stopped to the distance remaining on the runway; and
the third component is further configured to determine when the aircraft can be stopped by the aircraft autobraking system in the distance remaining on the runway by determining when the distance in which the aircraft can be stopped is not more than the distance remaining on the runway.

27. The system of claim 26, wherein the third component is configured to calculate the distance in which the aircraft can be stopped by the aircraft autobraking system using up to the maximum braking using at least one of:
airframe characteristics of the aircraft including one or more of a configuration of flaps, flaperons, and other highlight devices; and
environmental factors including one or more of runway slope, surface type, friction measurements provided by one of aircraft sensors and ground sensors, braking effectiveness reports, and atmospheric conditions.

28. The system of claim 25, wherein the second input interface is further configured to receive the position signal from a global positioning system.

29. The system of claim 25, wherein the first and second components of the processor are further configured to determine the distance remaining on the runway and to calculate the deceleration, respectively, until occurrence of an event selected from a pilot taking command of brakes and the aircraft stopping.

30. The system of claim 25, further comprising a display configured to display braking performance.

31. The system of claim 25, wherein the processor includes a portion of one of a flight management computer and a flight management system.

32. An aircraft comprising:
a fuselage;
a pair of wings;
at least one engine;
landing gear including a nose gear and at least two main landing gear; and
a system for braking the aircraft during a rejected takeoff from a runway, the system including:
 a first input interface configured to receive a rejected takeoff signal indicative of initiation of the rejected takeoff of the aircraft from the runway;
 a second input interface configured to receive a position signal indicative of a position of the aircraft on the runway;
 a processor including:
  a first component configured to determine distance remaining on the runway;
  a second component configured to calculate deceleration to stop the aircraft in the distance remaining on the runway;
  a third component configured to determine whether the aircraft can be stopped in the distance remaining on the runway by using up to a maximum braking; and
 an aircraft autobraking system configured to cause braking to be applied to aircraft brakes up to the maximum braking, wherein:
  when the aircraft can be stopped in the distance remaining on the runway, to apply the aircraft autobraking system according to the deceleration; and
  when the aircraft cannot be stopped in the distance remaining on the runway, to apply the maximum braking.

33. The aircraft of claim 32, wherein:
the third component is further configured to calculate a distance in which the aircraft can be stopped by the aircraft autobraking system using up to the maximum braking and to compare the distance in which the aircraft can be stopped with the distance remaining on the runway; and
the third component is further configured to determine when the aircraft can be stopped by the aircraft autobraking system in the distance remaining on the runway by determining when the distance in which the aircraft can be stopped is not more than the distance remaining on the runway.

34. The aircraft of claim 33, wherein the third component is configured to calculate the distance in which the aircraft can be stopped by the aircraft autobraking system using up to the maximum braking using at least one of:
airframe characteristics of the aircraft including one or more of a configuration of flaps, flaperons, and other highlight devices; and
environmental factors including one or more of runway slope, surface type, friction measurements provided by one of aircraft sensors and ground sensors, braking effectiveness reports, and atmospheric conditions.

35. The aircraft of claim 32, wherein the second input interface is further configured to receive the position signal from a global positioning system.

36. The aircraft of claim 32, wherein the first and second components of the processor are further configured to determine the distance remaining on the runway and to calculate the deceleration, respectively, until occurrence of an event selected from a pilot taking command of brakes and the aircraft stopping.

37. The aircraft of claim 32, wherein the system further includes a display configured to display braking performance.

* * * * *